United States Patent
Wybenga et al.

(10) Patent No.: US 7,564,860 B2
(45) Date of Patent: Jul. 21, 2009

(54) APPARATUS AND METHOD FOR WORKFLOW-BASED ROUTING IN A DISTRIBUTED ARCHITECTURE ROUTER

(75) Inventors: Jack C. Wybenga, Plano, TX (US); Patricia K. Sturm, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 10/431,774

(22) Filed: May 8, 2003

(65) Prior Publication Data
US 2004/0223504 A1 Nov. 11, 2004

(51) Int. Cl.
H04L 12/56 (2006.01)
(52) U.S. Cl. .................................... 370/420
(58) Field of Classification Search ........... 713/201; 370/466, 235.1, 420
See application file for complete search history.

(56) References Cited

U.S. PATENT DOCUMENTS

| | | | | |
|---|---|---|---|---|
| 5,915,088 A | * | 6/1999 | Basavaiah et al. | 712/28 |
| 6,456,628 B1 | * | 9/2002 | Greim et al. | 370/466 |
| 6,738,836 B1 | * | 5/2004 | Kessler et al. | 710/22 |
| 2001/0046227 A1 | * | 11/2001 | Matsuhira et al. | 370/355 |
| 2004/0088574 A1 | * | 5/2004 | Walter et al. | 713/201 |
| 2006/0212633 A1 | * | 9/2006 | Kasper | 710/260 |

* cited by examiner

*Primary Examiner*—Kevin C Harper
*Assistant Examiner*—Wanda Z Russell

(57) ABSTRACT

A router for transmitting data packets to and receiving data packets from N interfacing peripheral devices. The router comprises a plurality of processors that exchange data packets with each other over a common bus. A source processor transmits a data packet to a destination processor by storing the data packet in an output queue associated with the source processor and transmits an interrupt message to the destination processor. The destination processor, in response to the interrupt message, reads the data packet from the output queue.

20 Claims, 3 Drawing Sheets

APPARATUS AND METHOD FOR WORKFLOW-BASED ROUTING IN A DISTRIBUTED ARCHITECTURE ROUTER

TECHNICAL FIELD OF THE INVENTION

The present invention is directed, in general, to massively parallel routers and, more specifically, to a workflow-based method of routing for use in a distributed architecture router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to subnetworks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, routers are increasingly blamed for major bottlenecks in the Internet.

Early routers were implemented on a computer host so that the CPU of the host performed all tasks, such as packet forwarding via a shared bus and routing table computation. This plain architecture proved to be inefficient, due to the concentrated overhead of the CPU and the existence of congestion on the bus. As a result, router vendors developed distributed router architectures that provide efficient packet processing compared to a centralized architecture. In distributed router architectures, many of the functions previously performed by the centralized CPU are distributed to the line cards and a high-speed crossbar switch replaces the shared bus.

Conventional IP routers have a single processor that handles routing updates for all of router interfaces. Conventional high-end routers may have multiple processors, but still centralize the routing protocols in a single entity called a route server. Both of these technologies have scalability problems. As the number of interfaces increases, the rate of route updates increases. Eventually, the processing capability of the processor performing the route updates is exceeded.

Samsung Telecommunications America™ has defined a distributed architecture for the Galaxy™ IP router, where multiple routing engines distribute the workload of managing the interfaces and maintaining the routes. This requires that the management and protocol workload be distributed among various processors. In the Galaxy™ IP router, the workflow is distributed through a method in which each processor receives its work on its own input queue, completes its part of the routing problem, then passes the work to another processor for additional processing.

However, the previously proposed methods of workflow-based distribution applied to only two processors in a point-to-point link and used a push method, whereby the sending processor pushed the data to the receiving processor. However, current configurations of massively parallel routers, such as the Galaxy™ IP router, implement at least five processors in each routing node. The increase to more than two processors is a major change that requires many other factors to be considered.

Prior art routers do not scale easily to multiple processors. These routers do not include mechanisms to avoid collisions between multiple communication transactions among multiple processors and multiple processes. The prior art routers require an input queue for each data producer. This causes memory requirements to grow to unreasonably high levels. It is unacceptable to rebuild the code just to add more components to the system, since this requires an interruption of user data traffic to start the new load.

Therefore, there is a need in the art for an improved massively parallel router. In particular, there is a need for a massively parallel, distributed architecture router that implements multiple processors in each routing node and implements a mechanism to avoid collisions between multiple communication transactions among multiple processors and multiple processes. More particularly, there is a need for a massively parallel, distributed architecture router that implements multiple processors in each routing node without requiring an input queue for each data producer.

SUMMARY OF THE INVENTION

Samsung Telecommunications America™ has defined a distributed architecture for the Galaxy™ IP router, where multiple routing engines distribute the workload of managing the interfaces and maintaining the routes. This requires that the management and protocol workload be distributed among various processors. In the Galaxy™ IP router, the workflow is distributed through a method in which each processor receives its work on its own input queue, completes its part of the routing problem, then passes the work to another processor for additional processing. The present invention disclosure describes an application of the workflow-based processing distribution used in the Galaxy IP Router to distribute messages and data between multiple processors.

The present invention provides a simple, robust communications scheme to support a distributed architecture with workflow-based processing distribution. The present invention applies workflow-based routing to the sets of processors in, for example, a Galaxy™ IP router that are located in a front module and its two associated rear modules, where the processors are interconnected with a PCI bus. It is called Local Processor Communications (LPC). More generally, the present invention applies to any set of processors connected through some meshed interface or bus mechanism.

According to the principles of the present invention, a single physical output queue in each processor acts as multiple virtual output queues. The single output queue looks like a dedicated output queue to each receiving processor. The output queue comprises two data buffers. The destination processor reads one data buffer while the source processor fills the other data buffer. This reduces the memory requirement to two buffers of about 1500 bytes each, thereby limiting the amount of memory required.

The present invention uses hardware support in the form of asynchronous (async) variables that are used in the Local Processor Communications (LPC) design to allow the source processor to determine when it is free to de-allocate the message memory and set up for the next message transfer. This allows communications between many processors and processes with a minimal amount of memory and without conflicts or interference.

The present invention uses a pull method, wherein the destination (or target) processor pulls the data from the output queue of the source processor. The source processor uses a doorbell interrupt to alert the destination processor that the source processor has data ready for the destination processor.

The destination processor uses a direct memory access (DMA) operation to copy the data directly into the receive buffer of the destination (or target) application or protocol stack. Then, the destination processor clears the asynchronous variable and sends a return doorbell interrupt informing the source processor that the destination processor has consumed the data. Thereafter, the source processor can free the message buffers and set up for the next transfer.

The pull method allows the destination processor to prioritize the communications from other processors by selecting which processor it takes data from first. The pull method also has the advantage of allowing each processor to control its own resources. In a push method, it is possible for another processor to flood a destination processor with messages. This would cause the destination processor to thrash while answering interrupts, to use too much receive buffering memory space, or to allow its buffers to overrun.

By using the pull method, the destination (or target) processor can control the incoming data by simply not reading incoming data until the destination processor is ready. Thus buffer overflows, excessive buffer memory space, and interrupt thrashing are avoided. The source processor also maintains control because the source processor can stop sending data to non-responding destination processors. The present invention provides a timeout mechanism, so that the source processor can recover from transactions that do not complete in a reasonable time period.

The present invention uses a single message copy and a single DMA message transfer. The single copy is in the source processor, where the message is copied into an outgoing message buffer. The destination processor initiates a DMA transfer to move the message directly into the input queue of the target protocol stack or application, thus avoiding a message copy at the receive end. Avoiding copies is desirable because copies consume processor is and memory resources.

This method incorporates fault recovery mechanisms. The source processor protects transfers by utilization of write timers. The destination processor protects DMA transfers through timers. As a final protection, the master processor controls the asynchronous variables and looks for stuck transactions between any set of processors by associating timers with the asynchronous variables. Thus, the master processor can free any stuck transactions by clearing the asynchronous variables and freeing the associated buses.

Advantageously, the use of asynchronous variables enables external monitoring for stuck transactions, provides an indication of completion so buffers can be cleared, and provides communication control to prevent message collisions. This is particularly useful in a multi-processor environment. The asynchronous variables are used in a different manner from traditional semaphores. The asynchronous variables enable the destination processor to inform the source processor that the destination processor is done reading the data, so the source processor can free up the memory buffers and set up the output descriptor for the next message. They also provide fault detection by allowing a third processor to intervene to clear stuck transactions, thereby freeing the locked bus.

Instead of using one physical output queue for each destination processor, the present invention uses a single physical output queue that acts as multiple virtual output queues. Using a single output queue results in a design that is more efficient in the use of PCI mapped memory. One advantage of reducing the amount of PCI memory space shared by multiple processors is that it reduces the region of potential conflict by one processor overwriting the memory space of another processor thus spreading a crash by one processor into other processors.

The present invention supports easy expandability to more processors and supports "hot swapping" modules, since each processor implements a single physical output queue for all other processors. Thus, queues do not need to be added or removed as processors are added or removed. Scalability is also improved, since memory does not need to be allocated for output queues for each destination processor. The input queues are just the application input queues.

To address the above-discussed deficiencies of the prior art, it is a primary object of the present invention to provide, for use in a communication network, a router capable of transmitting data packets to and receiving data packets from N interfacing peripheral devices. According to an advantageous embodiment of the present invention, the router comprises a plurality of processors capable of exchanging data packets with each other over a common bus, wherein a source one of the plurality of processors transmits a data packet to a destination one of the plurality of processors by storing the data packet in an output queue associated with the source processor and transmits an interrupt message to the destination processor, and wherein the destination processor, in response to the interrupt message, reads the data packet from the output queue.

According to one embodiment of the present invention, the destination processor reads the data packet from the output queue using a direct memory access (DMA) operation.

According to another embodiment of the present invention, the DMA operation stores the read data packet directly into a receive buffer associated with the destination processor.

According to still another embodiment of the present invention, the output queue comprises a virtual output queue that is readable by each of the plurality of processors.

According to yet another embodiment of the present invention, the virtual output queue comprises a first data buffer and a second data buffer, wherein the source processor is capable of writing data packets into the first data buffer while the destination processor reads the data packet from the second data buffer.

According to a further embodiment of the present invention, the common bus comprises a Peripheral Component Interconnect (PCI) bus.

According to a still further embodiment of the present invention, the source processor transmits the interrupt message to the destination processor by transmitting a Message Signaled Interrupt (MSI) signal to the destination processor.

According to a yet further embodiment of the present invention, the destination processor transmits a response interrupt message to the source processor when the destination process has completed reading the data packet from the output queue, the response interrupt message indicating to the source processor that the output queue is available for storing another data packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
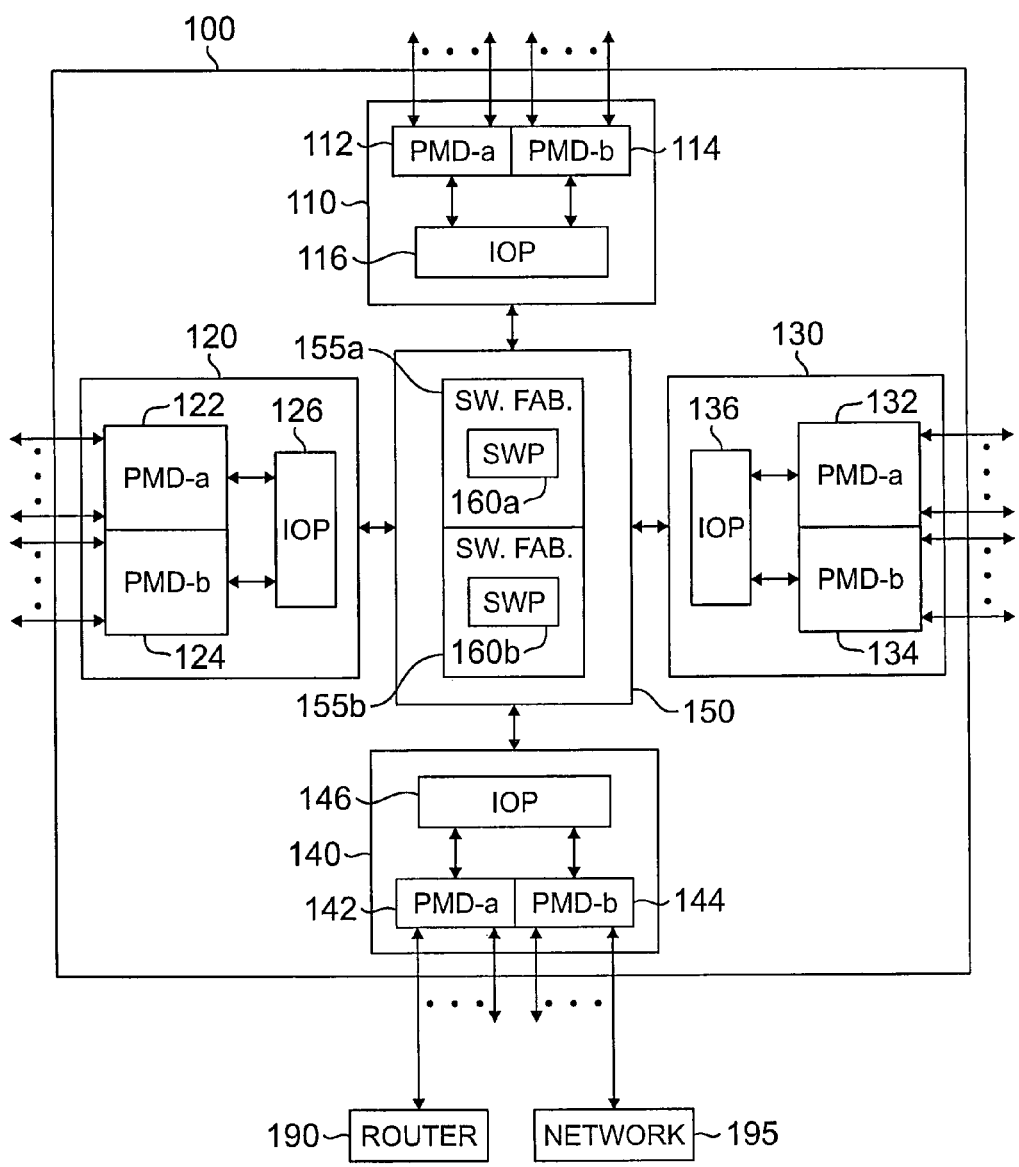
FIG. 1 illustrates an exemplary distributed architecture router that implements workflow-based processing distribution according to the principles of the present invention.
Figure 2:
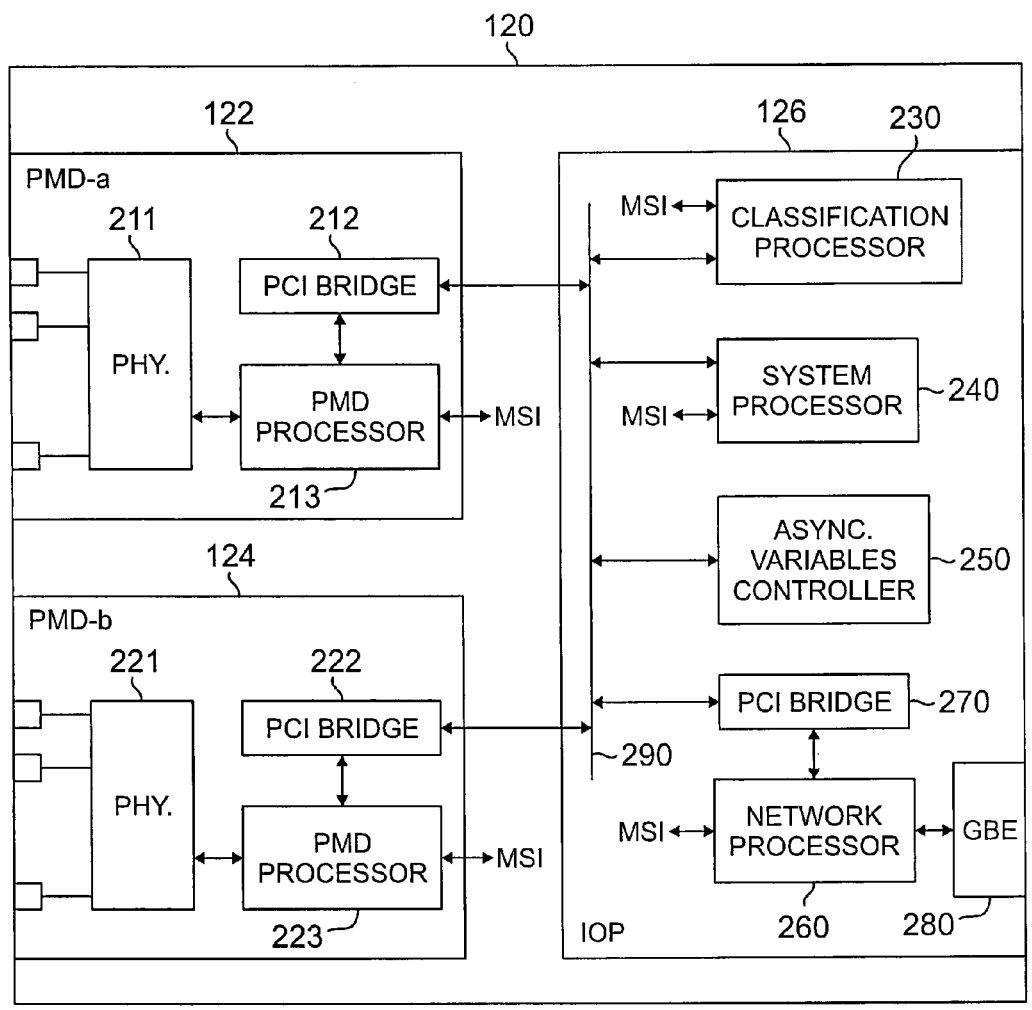
FIG. 2 illustrates selected portions of an exemplary routing node in a distributed architecture router according to one embodiment of the present invention.
Figure 3:
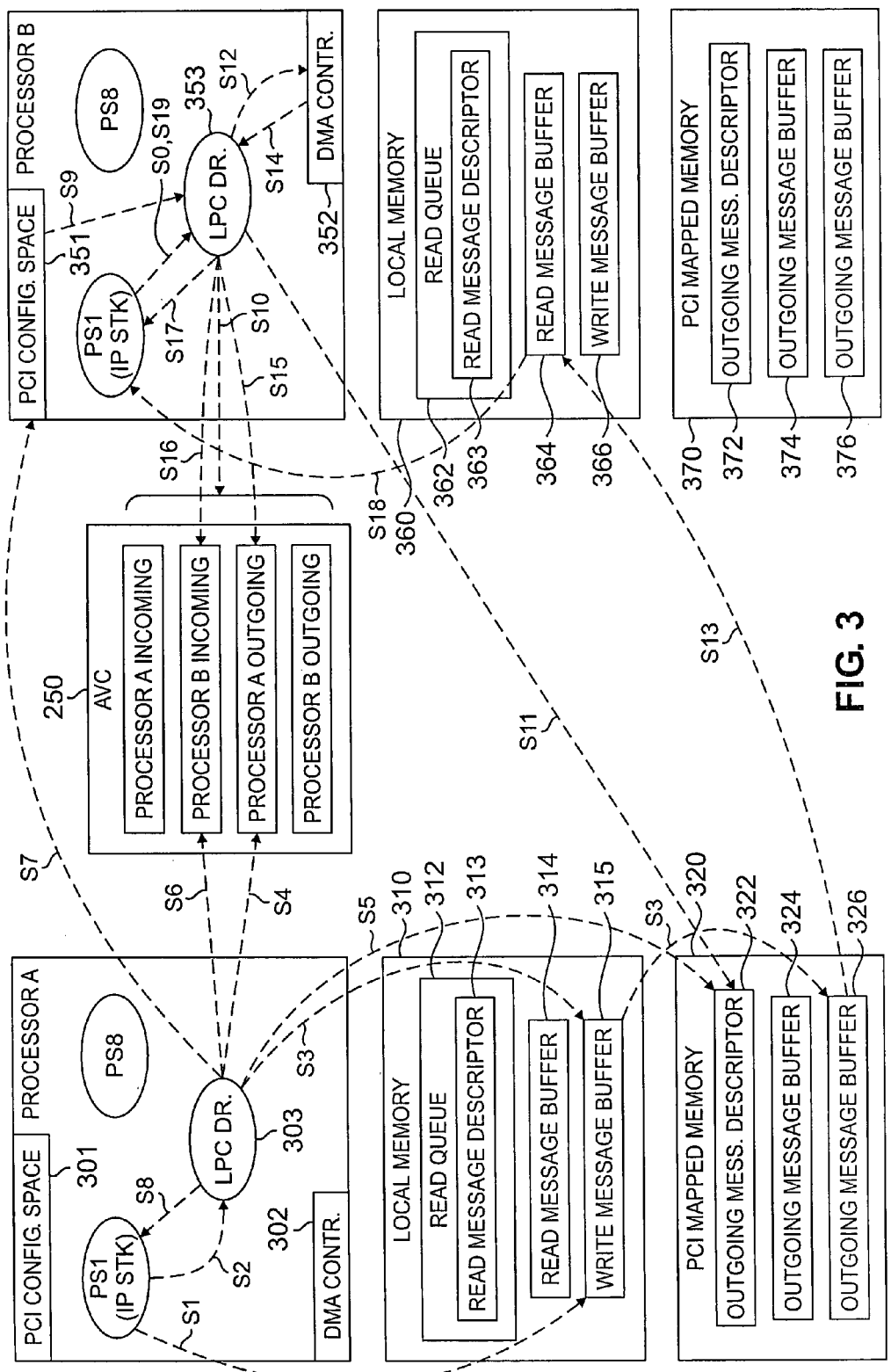
FIG. 3 is an operational flow diagram illustrating the operation of the exemplary routing node according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

FIG. 1 illustrates exemplary distributed architecture router 100, which implements workflow-based processing distribution according to the principles of the present invention. Distributed architecture router 100 provides scalability and high-performance using up to N independent routing nodes (RN), including exemplary routing nodes 110, 120, 130 and 140, connected by switch 150, which comprises a pair of high-speed switch fabrics 155a and 155b. Each routing node comprises an input-output processor (IOP) module, and one or more physical medium device (PMD) module. Exemplary RN 110 comprises PMD module 112 (labeled PMD-a), PMD module 114 (labeled PMD-b), and IOP module 116. RN 120 comprises PMD module 122 (labeled PMD-a), PMD module 124 (labeled PMD-b), and IOP module 126. RN 130 comprises PMD module 132 (labeled PMD-a), PMD module 134 (labeled PMD-b), and IOP module 136. Finally, exemplary RN 140 comprises PMD module 142 (labeled PMD-a), PMD module 144 (labeled PMD-b), and IOP module 146.

Each one of IOP module 116, 126, 136 and 146 buffers incoming Internet protocol (IP) packets from subnets or adjacent routers, such as router 190 and network 195. Additionally, each one of IOP modules 116, 126, 136 and 146 classifies requested services, looks up destination addresses from packet headers, and forwards packets to the outbound IOP module. Moreover, each IOP module also maintains an internal routing table determined from routing protocol packets and computes the optimal data paths from the routing table. Each IOP module processes an incoming packet from one of its PMD modules. According to one embodiment of the present invention, each PMD module frames an incoming packet (or cell) from an IP network (or ATM switch) to be processed in an IOP module and performs bus conversion functions.

Each one of routing nodes 110, 120, 130, and 140, configured with an IOP module and PMD module(s) and linked by switch fabrics 155a and 155b, is essentially equivalent to a router by itself. Thus, distributed architecture router 100 can be considered a set of RN building blocks with high-speed links (i.e., switch fabrics 115a and 155b) connected to each block. Switch processors, such as exemplary switch processors (SWP) 160a and 160b, located in switch fabrics 155a and 155b, respectively, support system management as well as packet switching between IOPs.

Unlike a traditional router, distributed architecture router 100 requires an efficient mechanism of monitoring the activity (or "aliveness") of each routing node 110, 120, 130, and 140. Distributed architecture router 100 implements a routing coordination protocol, called a loosely-coupled unified environment (LUE) protocol, that enables all of the independent routing nodes to act as a single router by maintaining a consistent link-state database for each routing node. The loosely-unified environment (LUE) protocol is based on the design concept of OSPF (Open Shortest Path First) routing protocol and is executed in parallel by daemons in each one of RN 110, 120, 130, and 140 and in SWP 160a and SWP 160b to select a designated RN among RN 110, 120, 130, and 140 and to synchronize whole routing tables. As is well known, a daemon is an agent program which continuously operates on a processing node and which provides resources to client systems. Daemons are background processes used as utility functions.

FIG. 2 illustrates selected portions of exemplary routing node 120 in distributed architecture router 100 according to one embodiment of the present invention. Routing node 120 comprises physical medium device (PMD) module 122, physical medium device (PMD) module 124 and input-output processor module 126. PMD module 122 (labeled PMD-a) comprises physical layer circuitry 211, physical medium device (PMD) processor 213 (e.g., IXP 1240 processor), and peripheral component interconnect (PCI) bridge 212. PMD module 124 (labeled PMD-b) comprises physical layer circuitry 221, physical medium device (PMD) processor 223 (e.g., IXP 1240 processor), and peripheral component interconnect (PCI) bridge 222. IOP module 126 comprises classification processor 230 (e.g., MPC 8245 processor), system processor 240 (e.g., MPC 8245 processor), asynchronous variables controller 250, network processor 260 (e.g., IXP 1200 or IXP 1240 processor), peripheral component interconnect (PCI) bridge 270 and Gigabit Ethernet connector 280. PCI bus 290 connects PCI bridges 212, 222 and 270, classification processor 230, system processor 240, and asynchronous variables controller 250.

IOP module 126, PMD module 122 and PMD module 124 provide hardware support for communications among their processors in the form of PCI bus 290, doorbell interrupts, and asynchronous (async) variables. PCI bus 290 interconnects the processors on the IOP module and PMD modules. Each of PMD processors 213 and 223, classification processor 230, system processor 240, asynchronous variables controller 250 and network processor 260 is capable of mastering PCI bus 290. PCI bridges 212, 222 and 270 separate PMD processors 213 and 223 and network processor 260 from the rest of the PCI devices. Thus, each one of network processor 260 and PMD processors 213 and 223 has a PCI bridge in front of it. These bridges are provided to compensate for the low drive capability of PMD processors 213 and 223 and network processor 260.

PCI bridges 212, 222 and 270 provide Message Signaled Interrupts (MSI) signals. This is an optional feature enabling a device to request service (i.e., generate an interrupt request to a processor) by writing a system-specified message to a system-specified address using a PCI DWORD memory write transaction. System processor 240 implements this feature in the form of its Message Unit (MU) with its associated generic message and doorbell register interface. A doorbell interrupt is initiated when a device performs a write operation to a pre-defined Configuration Data Register. This interrupt can be enabled and disabled. PMD processors 213 and 223 and network processor 260 implement this feature using the doorbell interrupt. A PCI device writes to the doorbell register to generate an interrupt. The DBELL_SA_MASK and DBELL_PCI_MASK registers can be used to mask these interrupts.

The software interrupts that are initiated by write operations to PCI configuration space are called doorbell interrupts hereafter. Each one of PMD processors 213 and 223, classification processor 230, system processor 240 and network processor 260 can send a doorbell interrupt to any other processor by writing to its PCI configuration space. The LPC drivers use the doorbell interrupt to initiate communications between the processors. Following a doorbell interrupt, data can be moved between the processors through DMA operations or through normal PCI bus accesses.

Asynchronous variables controller 250 in IOP module 126 provides asynchronous (async) variables that can be used as semaphores to control inter-processor communications, or for other functions, such as mailboxes between two processors. Asynchronous variables controller 250 provides 16 asynchronous variables, each comprising 10 bits: 1) an eight (8) bit data field accessible to software; and 2) two (2) control bits that are accessible only by hardware.

The two control bits are flags that the device hardware checks and manipulates when software accesses these asynchronous variables. The two flags are an empty flag and a full flag. Together these flags support four states: 1) uninitialized, 2) available, 3) in-use, and 4) undefined. The uninitialized state has the flags set to neither empty nor full and is the state entered when asynchronous variables controller 250 is reset. When an asynchronous variable is available for use, its flags are set to empty and not full. When an asynchronous variable is in use, its flags are set to full and not empty. The state machine in asynchronous variables controller 250 prevents the undefined state of full and empty from occurring.

Each asynchronous variable is mapped to two memory locations for two types of access: 1) protected and 2) non-protected. Protected mode is the normal mode for using these variables. Non-protected mode is available for asynchronous variable initialization and for error recovery. When a read operation is attempted in protected mode, asynchronous variables controller 250 checks the flags. If the asynchronous variable is in the empty or the uninitialized state, the read fails and software must attempt access later. If the asynchronous variable is in the in-use state, asynchronous variables controller 250 provides the 8 bits of data to the processor, clears the full state, and sets the empty state.

When a write is attempted in protected mode, asynchronous variables controller 250 checks the flags. If the asynchronous variable is in the in-use or uninitialized state, the write fails and software must attempt access later. If the asynchronous variable is in the available state, asynchronous variables controller 250 writes the 8 bits of data to the register, clears the empty state, and sets the full state.

When a read is attempted in non-protected mode, asynchronous variables controller 250 provides the 8 bits of data to the processor, and leaves the data and flags unchanged. The states of the flags do not affect this function. This allows a processor to check on asynchronous variable usage without affecting the processes using the variable.

When a write is attempted in non-protected mode, asynchronous variables controller 250 writes the 8 bits of data to the register, sets the full flag, and clears the empty flag. The initial states of the flags do not affect this function. This allows a variable to be initialized to the in-use state. A non-protected mode write operation followed by a protected mode read operation sets an asynchronous variable into the available state.

Asynchronous variables controller 250 maintains a timer on the full flag of each asynchronous variable that provides an interrupt to system processor 240 if the asynchronous variable is full for more than 20 milliseconds. Asynchronous variables controller 250 provides status information on the cause of the interrupt that can be read over the PCI bus and indicates which asynchronous variables timed out. System processor 240 may use this information to free locked asynchronous variables.

FIG. 3 is an operational flow diagram illustrating the operation of the exemplary routing node according to the principles of the present invention. Inter-processor communications between the IOP processors and the associated PMD processors occur via a driver called the Local Processor Communications (LPC) driver. A significant component of the LPC protocol is controlling the output buffers of each processor so that the buffers are not overwritten before the DMA transfers of the messages are completed. This is accomplished through the use of the asynchronous variables provided by asynchronous variables controller (AVC) 250.

The method described below is a pull method with a virtual output queue. In Steps 1-19, Processor A is the processor sending the data (i.e., source processor) and Processor B is the processor receiving the data (i.e., destination or target processor). Local memory 310 and PCI mapped memory 320 are associated with Processor A. Local memory 360 and PCI mapped memory 370 are associated with Processor B.

The LPC Driver supports up to eight (8) data sources and data destinations within each processor. These data sources and data destinations are applications or protocol stacks, such as the IP stack.

Initial Conditions: System processor 240 initializes all the asynchronous variables to the free state by an unprotected write followed by a protected read. Each processor (including system processor 240) initializes its own asynchronous variables to the free State by an unprotected write followed by a protected read. Each processor sets up an Outgoing Message Descriptor 322 in PCI space associated with its output asynchronous variable. Each processor knows the association between outgoing asynchronous variables and output buffer descriptors for each processor and knows the association between incoming asynchronous variables and processors. These are defined in system processor 240 and distributed to the other processors.

Additionally, each processor initializes doorbell interrupts and knows the doorbell interrupt for each processor. Finally, each processor has a read queue 312 (or 362) for each protocol stack interface. In each processor, each protocol stack pends one or more reads to LPC driver 303 (or 353) providing local memory buffers to receive the data. These pending read operations take the form of pend-on-driver completion, such as, for example, an interruptible sleep on timeout or an interruptible wait on event.

Data Transfer Process:

Step S1—In Processor A, the Protocol Stack (e.g., PS1) writes the outgoing message to write message buffer 315 in local memory 310 or points to an outgoing message already present in local memory space 310.

Step S2—In Processor A, the Protocol Stack calls the Write function of LPC driver 303 with a Write Message Buffer Pointer, Packet Size, and Destination using a function that sleeps until awakened upon completion and provides a timer that awakens it if the write is not completed in 10 milliseconds. It is noted that the destination indicates both destination Processor B and the destination process within Processor B. If the write timer expires, the write function returns to the application with a failure.

Step S3—LPC Driver 303 copies the packet from local memory 310 into one of its outgoing message buffers (i.e., outgoing message buffer 326) in PCI mapped memory 320. There are two outgoing message buffers (i.e., outgoing message buffers 324 and 326), so that a copy to one message buffer can be completed while LPC driver 303 is waiting for DMA completion on the other buffer. The message copies should be done in small blocks, such as 16 words at a time with a pause between each block. The asynchronous variable could be monitored for completion during this pause. This is the only required copy, other than the direct memory access (DMA) transfer in Step S13 that is done by hardware, rather than by software. In Step S1, a pointer to an outgoing message already in local memory may be used. A DMA operation transfers the message into the receive buffer of the protocol stack, so the protocol stack can read it directly in Step S18.

Step S4—LPC driver 303 writes the ID of Processor B into Processor A Outgoing asynchronous variable in asynchronous variable controller (AVC) 250 using a protected write operation. If the asynchronous variable is in use, AVC 250 generates a PCI Target Abort that interrupts Processor A, returning a write failure to the application or protocol stack. The application or protocol stack can retry until it succeeds. Note that if the asynchronous variable remains in the in-use state for 20 milliseconds (i.e., if the write does not complete and the receiving end does not clear the asynchronous variable in 20 milliseconds), asynchronous variables controller 250 interrupts system processor 240, allowing it to intervene in this lockup.

Step S5—LPC Driver 303 writes the message pointer, packet size, and destination into outgoing message descriptor 322. Outgoing message descriptor 322 for a second message cannot be written into Outgoing message descriptor 322 until the DMA of the previous message is complete, as indicated by the freeing of the associated asynchronous variable.

Step S6—LPC Driver 303 writes its own ID into Processor B Incoming asynchronous variable using a protected write operation. If the asynchronous variable is in use, AVC 250 generates a PCI Target Abort, returning a write failure to the application or protocol stack. The application or protocol stack can retry until is succeeds. Note that if the asynchronous variable remains in the in-use state for 20 milliseconds, AVC 250 interrupts system processor 240, allowing it to intervene in this lockup. This step of eliminating contention from multiple processors simultaneously interrupting a single process is optional. The doorbell interrupt of the PCI bus handles this contention, so in such an implementation, Step S6 may be eliminated.

Step S7—LPC Driver 303 sends a doorbell interrupt to Processor B by writing to PCI Configuration Space 351.

Step S8—LPC driver 303 returns, allowing Protocol Stack PS1 to free its buffer in local memory 310.

Step S9—LPC Driver 353 services the received doorbell interrupt.

Step S10—LPC driver 353 does an unprotected read of the asynchronous variables to determine the source of the doorbell interrupt. LPC driver 353 scans through the asynchronous variables until it finds an asynchronous variable for itself. If Step S6 is included, LPC driver 353 may read the source from Processor B Incoming asynchronous variable.

Step S11—LPC Driver 353 reads outgoing message Descriptor 322 in PCI mapped memory 320 to determine the packet location, size, and destination.

Step S12—LPC Driver 353 sets up DMA controller 352 to transfer the packet from outgoing message buffer 326 to the next buffer in read queue 362 of local memory 360 for the specified destination. LPC Driver 353 sets up a 10 millisecond timer, which is used to protect the DMA operation.

Step S13—Data is moved from outgoing message buffer 326 to read message buffer 364 under control of DMA controller 352.

Step S14—DMA Controller 352 interrupts Processor B when the move is completed and LPC driver 353 services this interrupt. If the 10 millisecond timer expires before the DMA is complete, LPC driver 353 cleans up the incomplete DMA and returns with a read failure.

Step S15—LPC Driver 353 stops the 10 millisecond DMA timer and does a protected read of Processor A Outgoing asynchronous variable, thereby freeing it.

Step S16—If Step S6 is performed, LPC Driver 353 does a protected read of Processor B Incoming asynchronous variable, thereby freeing it.

Step S17—LPC Driver 353 cleans up read queue 362, then completes the pending read of the Protocol Stack using a return with a parameter giving read message descriptor 363 of the completed transfer and allowing the IP stack to continue.

Step S18—In Processor B, Protocol Stack PS1 reads the packet from specified read message buffer 364. After finishing with this message, Protocol Stack PS1 may free read message buffer 364.

Step S19—In Processor B, Protocol Stack PS1 may pend additional reads to LPC Driver 353, as in Step S0.

The LPC Driver in each processor must know the ID, asynchronous variable location, and the location of the outgoing message descriptor 322 (372) for every processor. The outgoing message descriptor 322 for each processor has a fixed offset relative to the start of the PCI memory space of each processor. It is assumed that these will be defined in a ".h" file included in the code for system processor 240 and distributed to the other processors from system processor 240. If the IOP module is restarted, then these definitions must be distributed to all processors. If another processor is restarted, such as restarting PMD processor 213 in a hot-swap operation, this information must be distributed to the restarted processor by system processor 240.

The message distribution can be an unsolicited distribution by system processor 240 or can be distributed upon request from the other processor. Distribution upon request has the advantage of using the same distribution method to an individual card regardless of whether all cards have restarted or a single card has restarted. Distribution upon request also does not depend upon system processor 240 recognizing the restart of the other processor. The outgoing message buffers are referenced in the outgoing message descriptor, so the locations of the outgoing message buffers do not need to be distributed by system processor 240.

Upon receipt of a PCI MSI (doorbell interrupt), the LPC Driver reads the asynchronous variables from asynchronous variables controller 250 in the IOP module to determine the source of the interrupt. The source of the interrupt is determined by looking for the ID of the receiving processor in the asynchronous variable of the sending processor. There could be more than one processor sending data to the receiving processor. In this case, it can process one of these and wait for additional interrupts or it can process each of them in turn.

A priority scheme could be implemented to determine which processor gets preference. However, for the first version of the LPC Driver, a round robin scheme should be used for checking the asynchronous variables. Once the interrupting processor is determined, the LPC Driver reads the outgoing message descriptor 322 (372) of the sending processor from PCI mapped memory 320 (370) to determine the message location, size, and destination. It uses the destination to determine which read queue 312 (362) should be used to determine the read message buffer 314 (364).

Steps S6 and S16 relate to semaphores for incoming doorbell interrupts. The purpose of these semaphores is to prevent multiple processors from interrupting a single processor at the same time. Steps S6 and S16 are not required, since the processor doorbell hardware supports the handling of multiple incoming doorbell interrupts. However, Steps S6 and S16 are shown here to illustrate one approach that could be used to control the incoming interrupt rate or to allow the receiving processor to read a single asynchronous variable to determine the calling processor. If these doorbell semaphores are used, the value written into them is the ID of the sending processor.

Although the above-described embodiment of the present invention uses the PCI bus, the techniques defined here could be used for any distributed software architecture involving multiple processors that are interconnected by a bus or any fully meshed set of interfaces between the participating processors. A partially meshed set of interfaces is acceptable as long as there is a communications path between each pair of communicating processors.

The present invention requires access to the asynchronous variables by all of the processors participating in the workload sharing and requires at least one asynchronous variable per processor. However, the asynchronous variables are small, so they are not resource intensive. The present invention also requires the ability of each processor to interrupt the other processors. PCI doorbell interrupts were used in the foregoing example, but other interrupt mechanisms could be used. Also, a DMA operation is used in the above-described implementation to transfer the data between the processors, but this is not required. The destination processor could also read the data directly from the output buffer of the source processor.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a communication network, a router to transmit data packets to and receive data packets from N interfacing peripheral devices, said router comprising:
a plurality of processors exchanging data packets with each other over a common bus, wherein a source one of said plurality of processors transmits a data packet to a destination one of said plurality of processors by storing said data packet in an output queue associated with said source processor and transmits an interrupt message to said destination processor, wherein said output queue comprises a virtual output queue that is readable by each of said plurality of processors, and wherein said destination processor, in response to said interrupt message, initiates a pull method to retrieve data from the virtual output queue and reads said data packet from said output queue.

2. The router as set forth in claim 1 wherein said destination processor reads said data packet from said output queue using a direct memory access (DMA) operation.

3. The router as set forth in claim 2 wherein said DMA operation stores said read data packet directly into a receive buffer associated with said destination processor.

4. The router as set forth in claim 1 wherein said virtual output queue comprises a first data buffer and a second data buffer, wherein said source processor writes data packets into said first data buffer while said destination processor reads said data packet from said second data buffer.

5. The router as set forth in claim 4 wherein said common bus comprises a Peripheral Component Interconnect (PCI) bus.

6. The router as set forth in claim 5 wherein said source processor transmits said interrupt message to said destination processor by transmitting a Message Signaled Interrupt (MSI) signal to said destination processor.

7. The router as set forth in claim 1 wherein said destination processor transmits a response interrupt message to said source processor when said destination process has completed reading said data packet from said output queue, said response interrupt message indicating to said source processor that said output queue is available for storing another data packet.

8. A communication network comprising a plurality of routers to transmit data packets to and receive data packets from each other and from interfacing peripheral devices associated with said communication network, at least one of said plurality of routers comprising:
a plurality of processors exchanging data packets with each other over a common bus, wherein a source one of said plurality of processors transmits a data packet to a destination one of said plurality of processors by storing said data packet in an output queue associated with said source processor and transmits an interrupt message to said destination processor, wherein said output queue comprises a virtual output queue that is readable by each of said plurality of processors, and wherein said destination processor, in response to said interrupt message, initiates a pull method to retrieve data from the virtual output queue and reads said data packet from said output queue.

9. The communication network as set forth in claim 8 wherein said destination processor reads said data packet from said output queue using a direct memory access (DMA) operation.

10. The communication network as set forth in claim 9 wherein said DMA operation stores said read data packet directly into a receive buffer associated with said destination processor.

11. The communication network as set forth in claim 8 wherein said virtual output queue comprises a first data buffer and a second data buffer, wherein said source processor writes data packets into said first data buffer while said destination processor reads said data packet from said second data buffer.

12. The communication network as set forth in claim 11 wherein said common bus comprises a Peripheral Component Interconnect (PCI) bus.

13. The communication network as set forth in claim 12 wherein said source processor transmits said interrupt message to said destination processor by transmitting a Message Signaled Interrupt (MSI) signal to said destination processor.

14. The communication network as set forth in claim 8 wherein said destination processor transmits a response interrupt message to said source processor when said destination process has completed reading said data packet from said output queue, said response interrupt message indicating to said source processor that said output queue is available for storing another data packet.

15. For use in a router comprising a plurality of processors to exchange data packets with each other over a common bus, a method of transferring a data packet from a source one of the plurality of processors to a destination one of the plurality of processors, the method comprising:

storing the data packet in an output queue associated with the source processor, wherein the output queue comprises a virtual output queue that is readable by each of the plurality of processors;

transmitting an interrupt message from the source processor to the destination processor; and in response to the interrupt message, initiating a pull method to retrieve data from the virtual output queue and reading the data packet from the output queue into a receive buffer associated with the destination processor.

16. The method as set forth in claim 15 wherein the step of reading the data packet from the output queue comprises a direct memory access (DMA) operation.

17. The method as set forth in claim 15 wherein the virtual output queue comprises a first data buffer and a second data buffer, wherein the source processor writes data packets into the first data buffer while the destination processor reads the data packet from the second data buffer.

18. The method as set forth in claim 17 wherein the common bus comprises a Peripheral Component Interconnect (PCI) bus.

19. The method as set forth in claim 18 wherein the step of transmitting the interrupt message to the destination processor comprises the step of transmitting a Message Signaled Interrupt (MSI) signal to the destination processor.

20. The method as set forth in claim 15 further comprising the step of transmitting a response interrupt message from the destination processor to the source processor when the destination process has completed reading the data packet from the output queue, the response interrupt message indicating to the source processor that the output queue is available for storing another data packet.

\* \* \* \* \*

UNITED STATES PATENT AND TRADEMARK OFFICE
CERTIFICATE OF CORRECTION

PATENT NO. : 7,564,860 B2 Page 1 of 1
APPLICATION NO. : 10/431774
DATED : July 21, 2009
INVENTOR(S) : Jack W. Wybenga and Patricia K. Sturm It is certified that error appears in the above-identified patent and that said Letters Patent is hereby corrected as shown below:

Column 3, line 36, delete "is" after the term "processor"

Signed and Sealed this

Twentieth Day of April, 2010

David J. Kappos
*Director of the United States Patent and Trademark Office*